United States Patent

[11] 3,598,355

| [72] | Inventor | Helen V. Bryan English<br>16725 Knollwood Drive, Granada Hills,<br>Calif. 91344 |
|---|---|---|
| [21] | Appl. No. | 754,381 |
| [22] | Filed | Aug. 21, 1968 |
| [45] | Patented | Aug. 10, 1971 |

[54] CAMERA DOLLY
10 Claims, 8 Drawing Figs.

[52] U.S. Cl. .................................................... 248/430,
95/86, 248/178
[51] Int. Cl. ...................................................... F16m 11/20
[50] Field of Search ............................................ 248/23,
121, 422, 424, 429, 430, 163, 166, 439, 178, 179,
185, 346; 95/86; 108/143, 137

[56] References Cited
UNITED STATES PATENTS

| 1,230,819 | 6/1917 | Gall | 248/422 |
|---|---|---|---|
| 2,324,842 | 7/1943 | Huebner | 95/86 |
| 2,543,352 | 2/1951 | Brown | 248/184 |
| 2,624,252 | 1/1953 | Judd | 95/86 |
| 2,800,833 | 7/1957 | Kuscher | 248/422 |
| 2,842,026 | 7/1958 | Reese et al. | 95/86 |
| 2,953,190 | 9/1960 | Tanaka | 248/429 |
| 3,017,817 | 1/1962 | Sampson | 95/86 |
| 3,418,085 | 12/1968 | Rau | 248/178 |

FOREIGN PATENTS

| 579,644 | 7/1958 | Italy | 248/430 |
|---|---|---|---|

Primary Examiner—Marion Parsons, Jr.
Attorney—Roger A. Marrs

ABSTRACT: The camera dolly disclosed herein includes a frame having a pair of spaced-apart parallel rails carried on adjustable height leg supports for rollably mounting a camera carriage. The carriage includes a universal mount for releasably mounting a motion picture camera. Power means are provided for controllably moving the carriage on the rails via a drive train interconnecting the carriage on the rails. The camera dolly is adapted for employment for filming underwater scene sequences that are adapted to be viewed in a panoramic theater.

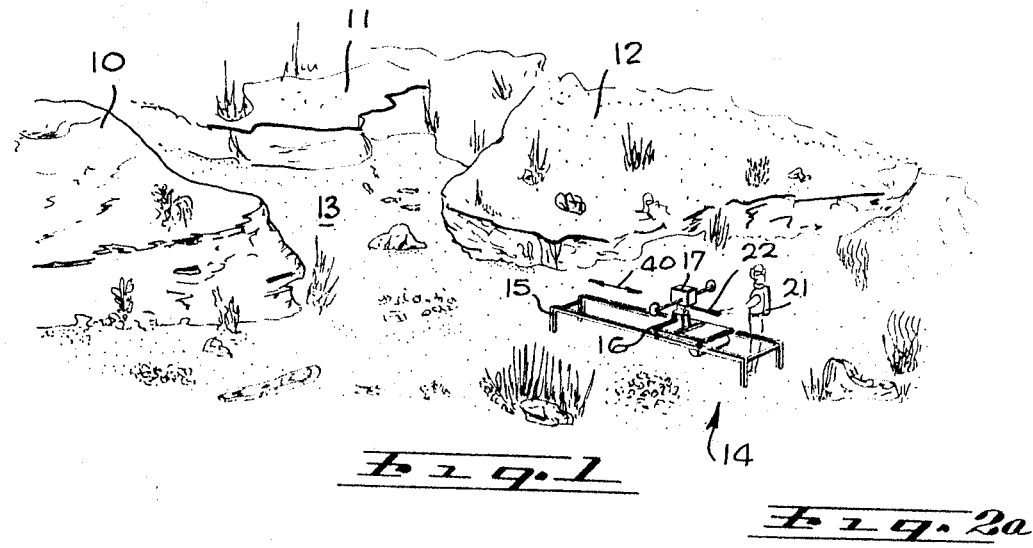
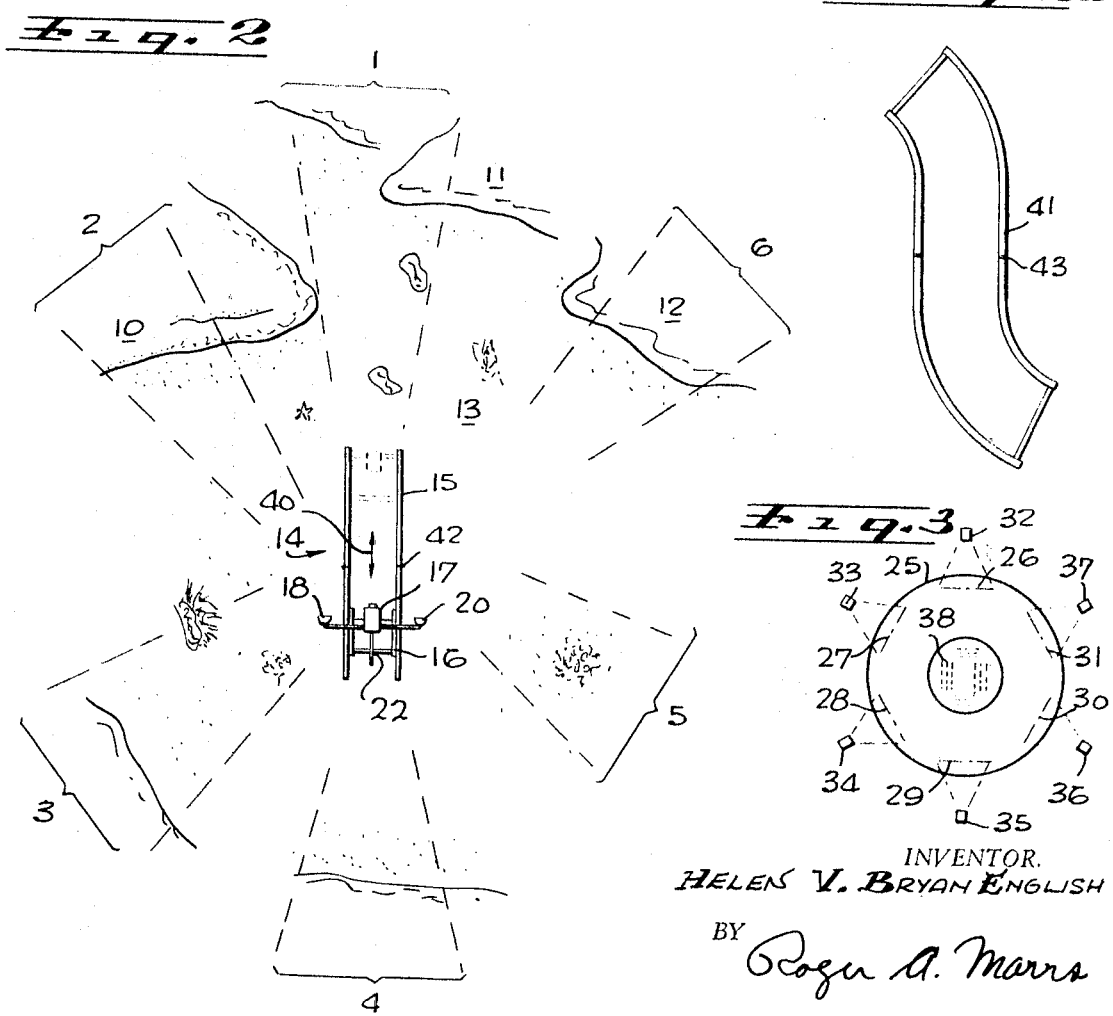

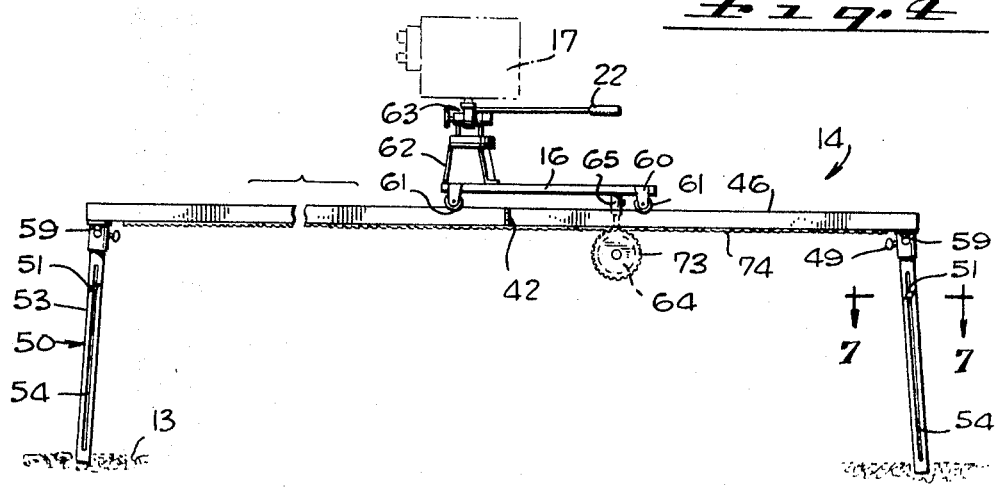
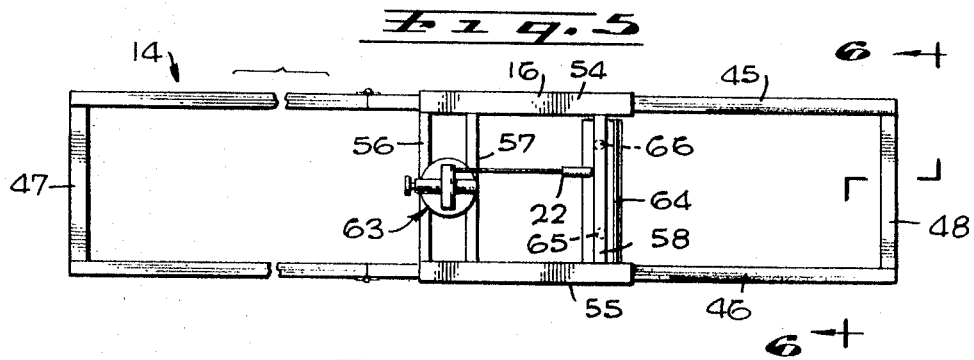
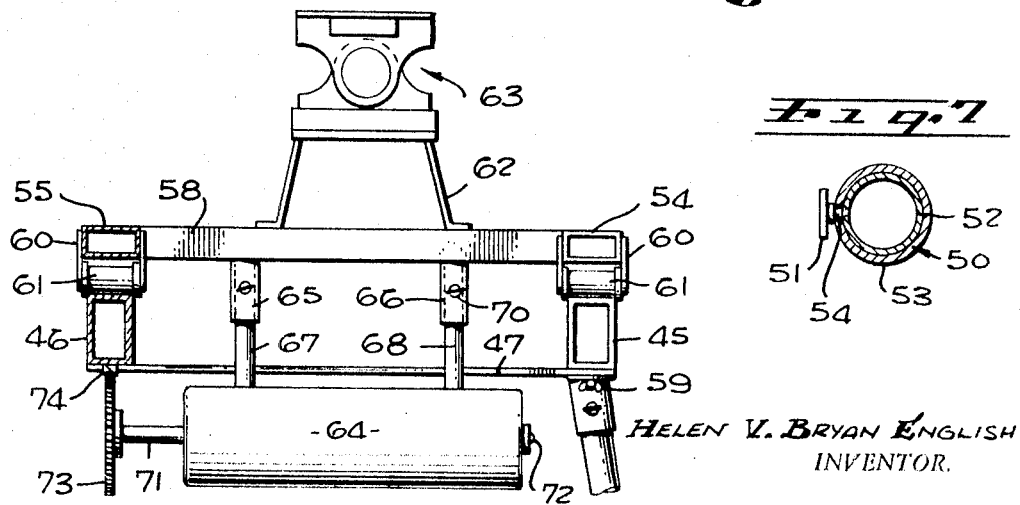

3,598,355

CAMERA DOLLY

BACKGROUND OF THE INVENTION

1. Field of the Invention

This invention relates to motion picture camera supporting apparatus and, more particularly, to a novel underwater camera dolly for movably supporting a camera so that the camera may be powered in a predetermined direction and yet manually pivoted about a universal axis so as to achieve unusual and distinctive filming effects suitable for providing the illusion of a continuous picture on a composite circular screen.

2. Description of the Prior Art

In the motion picture industry, it has been the usual practice to provide a seemingly continuous motion picture covering a circular field of 360° by employing a plurality of individual screens arranged in a circle with the audience being located within the space encompassed by the screen. One or more film projectors are usually associated with each screen and the resulting plurality of projectors are sometimes disposed centrally of the screens or are disposed behind each of the screens for rear projection. Such a panoramic theater is disclosed in U.S. Letters Patent No. 3,370,505 issued Feb. 27, 1968.

For producing film adapted to be presented on the plurality of screens in such a panoramic theater, special cameras are normally employed for photographing selected panoramas. Generally, such a camera provides a cluster of single camera units which are mounted in a central formation in such a way that for every optical center point of a polygonal projection surface, there is a corresponding optical axis. The central camera formation represents a miniature replica of the projection polyhedron on whose multiple surfaces the individual cameras are centered exactly. The camera cluster thus records that partial picture assigned to it when projection takes place on the circular or dome screen.

In other instances, the camera apparatus incorporating a plurality of conventional motion picture cameras is secured to a circular housing which is affixed to the upper portion of an automotive vehicle. The cameras are equidistantly spaced from one another with their optical axes extending radially outwardly relative to the housing. The film driving mechanisms of the cameras are synchronized so that at any instant, the camera assembly is photographing 360° of picture. Thus, as the automotive vehicle is driven along the roadway, the cameras will collectively photograph the entire area surrounding the vehicle.

Although such apparatus and camera clusters have been found operable for their intended purposes, it is obvious that such apparatus is expensive and awkward to use inasmuch as a plurality of cameras are required. In some instances, as many as 50 to 60 cameras are employed which require synchronization and proper optical axis alignment with respect to each other as well as the direction towards the scene or scene segment to be photographed. Such synchronizing equipment and multiple camera mounting housings are difficult to design, require expensive alignment and supporting structure and are extremely difficult to manipulate. Furthermore, such conventional camera clusters are adequate for recording on film an exact environmental condition as it is occurring; however, no provision is made so that the cameraman can modify any one of the scene sequences so as to provide an enhancing segment or special effect conditions.

Furthermore, these prior and conventional devices for filming panoramic scenes are totally unsuited for underwater work because of the complexity of the mechanism employed. Aside from the water environment, the terrain is limited for accommodation of complex structures not only from an operation viewpoint, but particularly with respect to setup and disassembly of the camera equipment.

SUMMARY OF THE INVENTION

Accordingly, the difficulties and problems encountered with conventional camera clusters and other camera apparatus for filming 360° environmental scenery are obviated by the present invention which provides an elongated frame having height adjustment means which includes a pair of parallel fixed spaced-apart rails on which a camera carriage is movably supported. The carriage is adapted to move the length of the frame on the parallel rails from one end thereof to the other under the control of a constant speed power source such as a governed electric motor. A universal mount joins a conventional camera to the carriage so that the camera follows the movement of the carriage as it is powered on the frame. The optical axis of the camera can be manually adjusted by a cameraman through handle means connected to the universal mount whereby the optical axis can be placed in any position desired by the cameraman.

By making successive runs with the camera along the length of the frame, with the camera optical axis directed in a different direction for each run, a plurality of film sequences may be taken in the same locale which, when simultaneously presented in a panoramic theater, will display the environment under which the filming took place. Furthermore, should it be desired to enhance or modify the environment at a particular time, one of the camera runs may include props or subject matter not normally available at the time that a preceding run has been taken. Therefore, the overall presentation of the simultaneous films when projected, is greatly improved by the filming techniques when viewed by the audience.

Therefore, it is among the primary objects of the present invention to provide a novel camera dolly adapted to be located in an underwater environment whereby a plurality of film sequences may be taken successively by a single camera so that when combined for simultaneous projection, an effective and realistic 360° panoramic presentation may be produced.

Another object of the present invention is to provide a novel camera dolly adapted for underwater work that employs a single camera including means for power driving the camera in a predetermined direction and additional means adapted for manual manipulation so as to change the optical axis of the camera while under power movement.

Another object of the present invention is to provide a novel camera supporting apparatus adapted to be manually operated and power operated in an underwater environmental condition.

Yet another object of the present invention is to provide a film camera apparatus of the aforesaid described nature which provides film sequences that afford the audience a maximum amount of realism when the sequences are projected in a panoramic theater.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a diagrammatic illustration of the novel camera dolly as employed as a typical underwater filming setting in accordance with the present invention;

FIG. 2 is a diagrammatic illustration, in plan view, of the environmental setting of FIG. 1 showing camera travel on the dolly during a filming sequence suitable for 360° projection and viewing;

FIG. 2a is a plan view of another embodiment of the present invention showing the dolly frame having a compound curve configuration;

FIG. 3 is a diagrammatic drawing of a suitable theater for projecting the film sequences taken with the use of the camera dolly of the present invention;

FIG. 4 is an enlarged side elevational view of the camera dolly shown in FIGS. 1 and 2;

FIG. 5 is a top plan view of the camera dolly;

FIG. 6 is a transverse cross-sectional view of the camera dolly as taken in the direction of arrows 6-6 of FIG. 5; and FIG. 7 is a cross-sectional view of the leg support of the camera dolly shown in FIG. 4 as taken in the direction of arrow 7-7 thereof.

DESCRIPTION OF THE PREFERRED EMBODIMENT

Referring to FIG. 1, an underwater environmental scene is depicted having irregular terrain represented by mounds or hills 10, 11 and 12 defining a valley in-between. The floor for the body of water is indicated by numeral 13 on which the apparatus of the present invention is supported as indicated in the direction of arrow 14. The setting further includes rocks, seaweed, fish and other natural environmental objects indigenous to the particular environment intended to be photographed.

The apparatus 14 is elongated and includes, in general, a frame 15 for movably supporting a carriage 16 which mounts a conventional motion picture camera 17 adapted for underwater photography. Suitable lighting may be provided a pair of underwater lamps 18 and 20 which are carried on opposite sides of the camera 17 so as to illuminate the field ahead of the camera intended to be filmed. An operator or cameraman in underwater garb and suitable oxygen equipment is indicated by numeral 21. The operator moves adjacent to the frame 15 and may manually manipulate the camera 17 via a handle means 22 whereby the optical axis of the camera may be selectively positioned at the will and discretion of the operator 21.

Referring now to the plan view of FIG. 2, a program of six filming sequences or views are suggested as represented by the numerals 1—6 and as indicated by the broken lines corresponding to the views thereof. For example, the filming sequence may commence in initially filming scene 1 by aligning the optical axis of the camera 17 with the mound 11 and causing the camera to move toward the mound for the entire length of the frame 15. For scene 2, the camera may be moved rearwardly to the far end of the frame and the camera optical axis rotated to the left approximately 45° so that the optical axis is in alignment with mound 10. The camera is then caused to move forwardly on the frame 15 as the filming progresses. The third scene is filmed by returning camera 17 to the rear of frame 15 and pivoting camera 17 so that its optical axis is in alignment with the desired scene 3. Again, the camera is moved on the frame 15 forwardly as filming continues. With respect to scene 4, the camera is again returned to the opposite end of the frame and the camera is pivoted so that its optical axis is aligned in the direction of scene 4 which is 180° of rotation from the objects of scene 1. The camera is then moved away from scene 4 on frame 15 so that the events are filmed in connection with scene 4. Filming of scenes 5 and 6 follow the sequence previously described with respect to scenes 1—4.

Since each of the filming sequences is in series, it is possible to introduce any desired object, prop, natural moving subject matter such as a fish, or other real or illusionary effects into any desired scene without modification, interference or alteration of any prior or subsequent scene which have already been taken or are scheduled to be taken. By properly recording the scenes taken in a numerical sequence, the film of each scene, when developed and placed into multiple projectors, can duplicate, during simultaneous projection, the total environment under which the scenes were taken.

For example, a diagrammatic illustration of a suitable panoramic theater for viewing the plurality of scene sequences simultaneously is shown in FIG. 3. The theater is represented by numeral 25 and includes a plurality of projection screens 26—31 inclusive adapted for rear screen projection by means of a plurality of projectors 32—37 inclusive.

The viewing audience is seated in the theater 25 in the area designated by numeral 38. Projector 32 projects scene 1 on the rear of screen 26, projector 33 projects scene 2 on the rear of screen 27, projector 34 projects scene 3 on the rear screen 28 and so forth, so that all of the projectors project all of the scenes simultaneously on their associated viewing screens whereby the audience seated in area 38 is completely surrounded by the film environment under which the filming took place. During simultaneous projection, for example, scene 1 shown on screen 26 will create an impression to the audience that the objects in the scene are moving toward them while objects projected on screen 29 representing scene 4 will appear to be moving away from the audience. Additionally, it is to be understood a seventh sequence may be shown by maneuvering camera 17 so that its optical axis is perpendicular to floor 13 and that the film sequence may be presented by another projector and screen arrangement located above the audience so that a completely omnidirectional environment may be simultaneously presented to the audience.

It is to be noted that the frame 15 shown in FIGS. 1 and 2 is of rectangular configuration so that the camera 17 moves from one end to its opposite end in a rectilinear movement as indicated by the double arrow 40. However, the inventive concept contemplates that the frame 15 may take the form of a compound curvature such as that shown in FIG. 2a wherein the carriage 17 moves between the opposite ends of the frame 41 so as to follow a tortuous path. By providing a curved path for the camera, additional illusionary and impressionistic scenes may be portrayed and the latitude of film content greatly enhanced. Frames 15 and 41 include pivotal joints 42 and 43, respectively, on the opposite sides thereof in order to facilitate assembly and disassembly under adverse underwater conditions. The structure of the frame will be described more fully with respect to the following figures.

Referring now in detail to FIGS. 4 and 5, it can be seen that the camera dolly apparatus of the present invention includes frame 14 having a pair of parallel rails 45 and 46 arranged in fixed spaced apart relationship by means of end pieces 47 and 48 detachably coupled to the opposite ends of the rails respectively by fasteners 59. The rails are supported on the body of water floor 13 by means of adjustable height legs 50 located at each corner of the frame. Each leg 50 is of the telescoping type in which an extension portion 52 is slidably mounted within an outer tubular portion 53 so that the apparatus may be adjusted not only in height but may be stabilized on uneven terrain by adjusting the extension portions of each leg accordingly. As shown in FIG. 7, a screw type fastener 51 may be employed for releasably securing the inner extension portion 52 to the outer portion 53. Preferably, the outer portion 53 includes an elongated slot 54 adapted to permit the passage of the shank of fastener 51 therethrough.

The carriage 16 is movably mounted on the rails 45 and 46 and includes a pair of parallel members 54 and 55 connected together by transverse braces 56, 57 and 58. The underside of each member 54 and 55 includes roller means comprising a yoke 60 rotatably mounting a wheel or roller 61 so that the carriage is movably mounted on the upper surface of the rails 45 and 46, respectively. Preferably, each of the rollers 61 and their associated yokes 60 are located at the respective corners of the carriage whereby the carriage may be moved between the opposite ends of the frame. The carriage 16 further includes a tower 62 located above the forward set of carriage rollers on which is mounted a universal mount 63. When properly unlocked, the universal mount may be moved in a universal manner about a desired axis by manipulation of the handle means 22 cantilevered outwardly from fixed securement with the universal mount. The camera 17 is suitably detachably carried on the universal mount so as to follow movement thereof in response to positioning by the handle means. Preferably, the longitudinal axis of the handle means 22 lies parallel to the optical axis of the camera 17.

Screw-type fasteners 49 are employed for detachably connecting the legs to the end pieces 47 and 48, respectively, while screw-type fasteners 59 are employed to couple the end pieces 47 and 48 to the opposite ends of the rails 45 and 46, respectively. Therefore, it can be seen that the legs may be detachably mounted as well as the end pieces and the rails so that the apparatus may be readily assembled or disassembled underwater without necessitating complicated mechanisms. Additionally, by providing hinge connections 42 on each of the rails 45 and 46, the rails may be folded so as to shorten their overall length during transportation to and from the filming site.

Referring in detail to FIG. 6, power means are provided for moving the carriage 16 along rails 45 and 46 which comprise a motor housing 64 carried from brace 58 on the carriage 16 by means of sleeves 65 and 66 and rods 67 and 68. The rods 67 and 68 are slidably carried within the bores of the sleeves 65 and 66 and a screw-type fastening device 70 is employed to secure the rods to the sleeves at a desired height. Furthermore, by this means the motor housing 64 may be detachably connected from the carriage. The electric motor and its battery power supply are enclosed in a watertight fashion within the housing 64 and serve to rotate a drive shaft 71 projecting outwardly from one end of the housing 64. A suitable ON/OFF switch 72 is provided for interconnecting the motor with the battery for energizing the motor whereby the carriage may be powered in one direction and reversed for power movement in the opposite direction.

The free end of drive shaft 71 is provided with a circular gear 73 in mesh with a plurality of gear teeth 74 provided on the underside of rail 46. In this manner, the rotation of circular gear 73 causes movement of the carriage 16 along the rails 45 and 46 via rollers 61. The opposite ends of each roller 61 are provided with guide flanges adapted to register against the opposite sides of each of the rails as the roller moves along the top surface thereof. This means provide sufficient guiding for the carriage so that the carriage will not roll from the rails.

In view of the foregoing, it can be seen that the camera dolly apparatus of the present invention provides a versatile tool or equipment for the movie industry in which a variety of special illusions incorporating both natural and artificial scenery is provided. The dolly may be readily assembled or disassembled under the surface of a body of water by means of the simple detachable connections for the plurality of rails, legs, carriage, universal mount and camera. By means of the power drive for the carriage, synchronization between the various filming sequences of scenes 1—6 for example, are automatically provided whereas the particular optical axis of the camera may be readily manipulated manually by the camera operator via handle means 22. The series of film sequences may then be shown simultaneously in a panoramic theater such as shown in FIG. 3 so that the audience may receive the full impact of 360° projection.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim is:

1. A camera dolly apparatus adapted to mount a motion picture camera for use in an underwater environment comprising:
   an elongated frame having parallel fixed spaced apart rails, each of said rails having an upper smooth surface;
   legs connected at the opposite ends of said frame for selectively adjusting the height of said frame above a supporting surface;
   screw fasteners interconnecting said legs to said frame in a detachable, disconnect relationship for repeated assembly and disassembly in said underwater environment;
   a carriage movably supported on said parallel rails adapted to reciprocally move between the opposite ends of said frame on said rail smooth surfaces including a plurality of rollers rotatably mounted on said carriage for movably supporting and guiding said carriage on said frame whereby said carriage may be lifted from said frame to effect disassembly;
   a universal mount secured to said carriage on its end opposite to the end movably supported on said frame and being adapted to releasably mount the camera thereon;
   handle means secured to said universal mount for manually selecting a predetermined optical axis of the camera; and
   power means downwardly depending from said carriage in detachable connection therewith and operably coupling said carriage to said frame for moving said carriage on said rails from one end thereof to the opposite end thereof at a predetermined rate.

2. The invention as defined in claim 1 wherein
   said power means includes an electric motor and battery supply therefor;
   a watertight housing downward depending from said carriage enclosing said motor and said battery supply; and
   a gear train interconnecting said motor with said frame whereby relative movement therebetween is produced.

3. The invention as defined in claim 1 wherein
   said power means includes a watertight housing secured to said carriage and downwardly depending therefrom between said parallel rails;
   an electric motor and battery supply enclosed in said housing; and
   a gear train coupling said motor to said frame for effecting relative movement therebetween whereby said carriage moves on said rails.

4. The invention as defined in claim 3 wherein
   said gear train includes a circular gear directly driven by said motor and a linear gear carried on the underside of a selected one of said rails intermeshed with said circular gear.

5. The invention as defined in claim 4 including
   an adjustable sleeve and rod arrangement securing said housing to the underside of said carriage.

6. The invention as defined in claim 5 wherein
   each of said rails are formed by coextensive segments joined together at opposing ends by a pivotal connection.

7. The invention as defined in claim 6 wherein
   said frame and said rails constitute a compound curve in plan view.

8. In a camera dolly for mounting a motion picture camera in an underwater environment adapted to accommodate repetitive camera movement in a fore and aft direction to film a series of different scene sequences comprising the combination of:
   an elongated frame having a pair of parallel rails arranged in fixed spaced-apart relationship and each rail having a smooth upper track surface and a toothed lower surface;
   adjustable legs detachably secured to the opposite ends of said frame for supporting said frame on the floor of a body of water;
   a carriage carried on said pair of rails and adapted to travel between the opposite ends of said frame;
   roller means carried on said carriage for rollably supporting said carriage on said smooth upper surface of said rails;
   a universal mount detachably carried on said carriage for detachably mounting said camera thereon;
   handle means fixedly secured to said universal mount for manually selecting a predetermined optical axis for said camera;
   power means secured to the underside of said carriage including a gear train interconnecting said carriage with a selected one of said toothed surfaces of said rails for moving said carriage in a predetermined direction on said rails at a selected rate of speed; and
   fastener means for releasably coupling said legs to said opposite ends of said frame, for releasably coupling said power means to said carriage and for releasably coupling said universal mount to said carriage so that a detachable assembly is produced permitting ready assembly and disassembly in said underwater environment.

9. The invention as defined in claim 8 wherein
said gear train includes a circular gear driven by an electric battery operated motor and a set of straight gear teeth carried on the underside of said selected rail meshed with said circular gear.

10. The invention as defined in claim 9 including
a watertight and sealed enclosure for carrying said motor; and
means detachably connecting said enclosure to said carriage.